US009081957B2

(12) United States Patent
Roden, III

(10) Patent No.: US 9,081,957 B2
(45) Date of Patent: Jul. 14, 2015

(54) DYNAMIC OPERATIONAL WATERMARKING FOR SOFTWARE AND HARDWARE ASSURANCE

(71) Applicant: Thomas Gilbert Roden, III, New Windsor, MD (US)

(72) Inventor: Thomas Gilbert Roden, III, New Windsor, MD (US)

(73) Assignee: Ryatheon BBN Technologies Corp, Cambridge, MA (US)

( * ) Notice: Subject to any disclaimer, the term of this patent is extended or adjusted under 35 U.S.C. 154(b) by 91 days.

(21) Appl. No.: 13/761,675

(22) Filed: Feb. 7, 2013

(65) Prior Publication Data

US 2014/0223554 A1 Aug. 7, 2014

(51) Int. Cl.
*G06F 21/00* (2013.01)
*G06F 21/55* (2013.01)
*G06F 21/57* (2013.01)

(52) U.S. Cl.
CPC ............ *G06F 21/552* (2013.01); *G06F 21/577* (2013.01)

(58) Field of Classification Search
CPC .............................. G06F 21/552; G06F 21/577
USPC .......................................................... 726/22
See application file for complete search history.

(56) References Cited

U.S. PATENT DOCUMENTS

2008/0250498 A1* 10/2008 Butti et al. ...................... 726/23
2009/0086973 A1* 4/2009 Buddhikot et al. ............ 380/273
2009/0327736 A1* 12/2009 Cam-Winget et al. ........ 713/181
2011/0016342 A1* 1/2011 Rowan et al. .................. 713/340
2012/0137367 A1* 5/2012 Dupont et al. .................. 726/25
2012/0179952 A1* 7/2012 Tuyls et al. .................... 714/768
2014/0040985 A1* 2/2014 Wang ................................ 726/3

OTHER PUBLICATIONS

Sheng et al., "Detecting 802.11 MAC Layer Spoofing Using Received Signal Strength", published in INFOCOM 2008. The 27th Conference on Computer Communications. IEEE.*
Dolev, D., et al., "Reaching Approximate Agreement in the Presence of Faults", Journal of the Association for Computing Machinery, 33(3), (1986), 499-516.
Hamilton, J., et al., "A Survey of Statis Software Watermaking", (2011), 100-107.

(Continued)

*Primary Examiner* — Yin-Chen Shaw
*Assistant Examiner* — John B King
(74) *Attorney, Agent, or Firm* — Schwegman Lundberg & Woessner, P.A.

(57) ABSTRACT

This disclosure addresses systems and methods for the protection of proprietary information by monitoring operational watermarks of an apparatus. A monitoring device may receive logical or physical watermark data from a defended apparatus. Watermark data may include any operational or environmental variable related to the defended apparatus. The monitoring device may maintain a baseline profile for the defended apparatus that includes watermark data. During monitoring of the defended apparatus by the monitor device, changes in the watermark data may be analyzed to determine if the baseline should be dynamically updated, or if the change indicates an anomaly. Anomalies may indicate an attempt to tamper with the defended apparatus. In response to the change that indicates an anomaly, the monitoring device may scrub the contents of the defended apparatus. In an embodiment, the monitoring device may also scrub its own memory in response to an anomaly.

19 Claims, 5 Drawing Sheets

(56) References Cited

OTHER PUBLICATIONS

Keller, J., "Anti-tamper technologies seek to keep critical military systems data in the right hands", [online]. Military & Aerospace Electronics. [retrieved on Feb. 11, 2011]. Retrieved from the Internet: <URL: http://www.militaryaerospace.com/mae/en-us/index/display/generic-article-tools-template.articles.military-aerospace-electronics.exclusive-conte, (2011), 6 pgs.

Van Oorschot, P. C., et al., "Hardware-Assisted Circumvention of Self-Hashing Software Tamper Resistance", IEEE Transactions on Dependable and Secure Computing, 2(2), (2005), 82-92.

* cited by examiner

DYNAMIC OPERATIONAL WATERMARKING FOR SOFTWARE AND HARDWARE ASSURANCE

TECHNICAL FIELD

Embodiments pertain to hardware and software security. Some embodiments relate to detecting tampering with hardware devices or software applications. Some embodiments relate to detecting system intrusions. Some embodiments relate to anti-tampering techniques. Some embodiments relate to dynamic watermarking. Some embodiments relate to out-of-band data and execution protection.

BACKGROUND

Various techniques exist to reverse engineer software or hardware devices. Various techniques may be applied to protect hardware or software; however, physical destruction, hardware cloaking, and code obfuscation are often ineffective against interface-based tampering. Software integrity techniques often utilize executable comparisons, which may focus on the comparison of entire executable programs for similarities, and may not be able defend against real-time attacks.

Modern computing assets often present interface-based attack surfaces that may be vulnerable to tampering without any physical intrusion. Known host-based assurance and anti-tamper techniques may rely upon a priori knowledge, such as attack signatures, as well as the integrity of the system being defended. However, such static techniques may be vulnerable to multiple attacks. Accordingly, interest in preventing reverse engineering and device tampering has increased due to the widespread adoption of computing technologies and the large amount of data that may be subject to exploitation by malicious entities.

BRIEF DESCRIPTION OF THE FIGURES

Embodiments discussed in the present document are illustrated, by way of example, and not limitation, in the Figures of the accompanying drawings in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Real-time—For the purposes of this specification and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine. Further, introducing artificial delays between input and response should not cause the functionality to be outside the scope of real-time, unless the delay serves a particular purpose.

Reliably establishing provenance, pedigree and assurance is desired to prevent the extraction of proprietary technology that may be embedded in equipment such as tactical radios, sensors, telemetry units, missiles, munitions, and other military or proprietary devices. Because most assurance and anti-tamper techniques can eventually be defeated by a determined adversary, new and novel techniques are continuously needed. For example, modern technology assets often present interface-based attack surfaces (e.g., interface or communication ports) which are vulnerable to compromise without requiring physical intrusion of a device. Current device-based assurance and anti-tamper techniques rely upon the integrity of the system being defended; if the integrity of the device is compromised the defensive system is also compromised.

Therefore, one example problem that may be solved by example embodiments disclosed herein is the need for systems and methods to shadow (e.g., monitor) a defended apparatus to prevent tampering with the apparatus and to mitigate the loss of any proprietary information. Monitoring of the defended apparatus may be performed continuously by dynamically monitoring operational watermarks of the defended system, and taking defensive action when anomalies (e.g., tampering) are detected.

Figure 1:
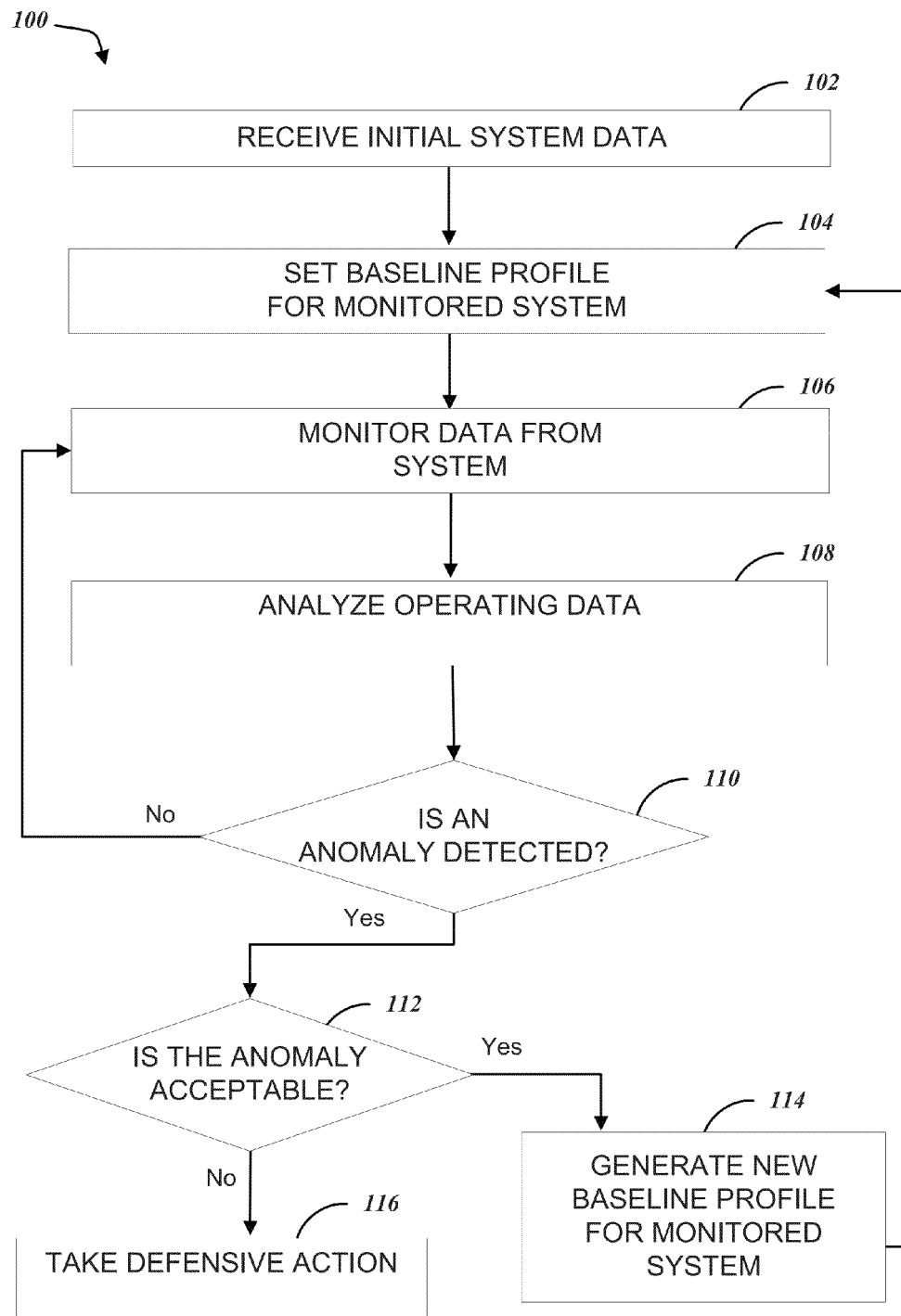
FIG. 1 illustrates a scheme for dynamically monitoring a system, in accordance with some embodiments.

By way of example, FIG. 1 illustrates a scheme 100 for dynamically monitoring a system with operational watermarks. The use of dynamic operational watermarks may provide reliable provenance, pedigree, and assurance regarding the integrity of the system, as well as real-time tamper detection, mitigation, and the prevention of proprietary technology extraction from the system.

At 102, initial system data about the system may be received by a monitoring device. The initial system data may be provided to the monitoring device in the form of a pre-packaged configuration, such as a configuration file loaded by a technician or other user; or directly from the system upon power up or over an initial period of time.

At 104, a baseline profile for a monitored system is established. The baseline profile may comprise watermarks that include logical and physical operational parameters of the defended system. The watermarks may also include environmental data. The logical watermark parameters may include operational data of the system such as execution timing, execution sequencing, data transaction, input activity, output activity, function periodicity, or any other logical operation performed by, for example, a processor or other logic device in the system. The physical watermark parameters may include environmental data of the system such as a temperature of the defended apparatus as provided by the system or a thermocouple attached to the system, a rate of power consumption by the system, movement, vibrations, or any other physical data that may be obtained by the monitoring device.

At 106, operating or environmental data received from the monitored system is received by the monitoring device. Operating or environmental data may be received continuously, periodically, in a round-robin basis, or at any other appropriate time interval or frequency. Data may be collected from the watermarks in response to a heterogeneous mix of tamper attacks, such as halting the processor, debugging, targeted execution, input/output (I/O) manipulation, power fluctuations, and temperature fluctuations. The detection algorithms and control structure for the monitoring device may be based upon the characterization of the collected data. The detection performance, operational watermark granularity, and computational requirements of the monitoring device may be bounded using the data collected from laboratory or real-time tuning. In an example, the monitoring device may be limited to defending only systems that execute in a deterministic manner, such as those devices that utilize a real-time operating system on a single processor.

At 108, any changes in the operating or environmental data are analyzed or compared to the baseline profile for the monitored system. At 110, detection of potential tampering with the monitored system may be based upon operational anomalies rather than static parameters. For example, a monitoring device, such as the monitor 201 of FIG. 2, may perform out-of-band temporal and collective analysis of the watermarks.

If no anomalies are detected (for example, any deviation in the operating or environmental data is within a predetermined threshold range or acceptable or rate of change based on previous data (e.g., hysteresis)), then the monitoring and analysis operations continue at 106. If an anomaly is detected that is outside of the predetermined threshold, then further analysis is performed to determine, at 112, if the anomaly is acceptable.

If the anomaly is acceptable, then at 114, a new baseline profile is generated for the monitored system, and the monitoring and analysis operations continue at 106. An acceptable anomaly may be a change in an environmental condition, such as humidity or temperature, that is cyclical or seasonal.

If the anomaly is not acceptable then, at 116, a defensive action is taken. An anomaly that is not acceptable may include an indication that a defended system has been moved, or that a connector has been coupled to the defended system causing an increase in power usage or a change in program execution by the defended system. The defensive action may include scrubbing the system of any data or proprietary technology. Scrubbing may include erasing any erasable memory of the system or of the monitoring device. In an example, the defensive action may include performing an action that would physically damage the monitored system or the monitoring device, such as applying an excessive electrical current to one or more logic devices.

Figure 2:
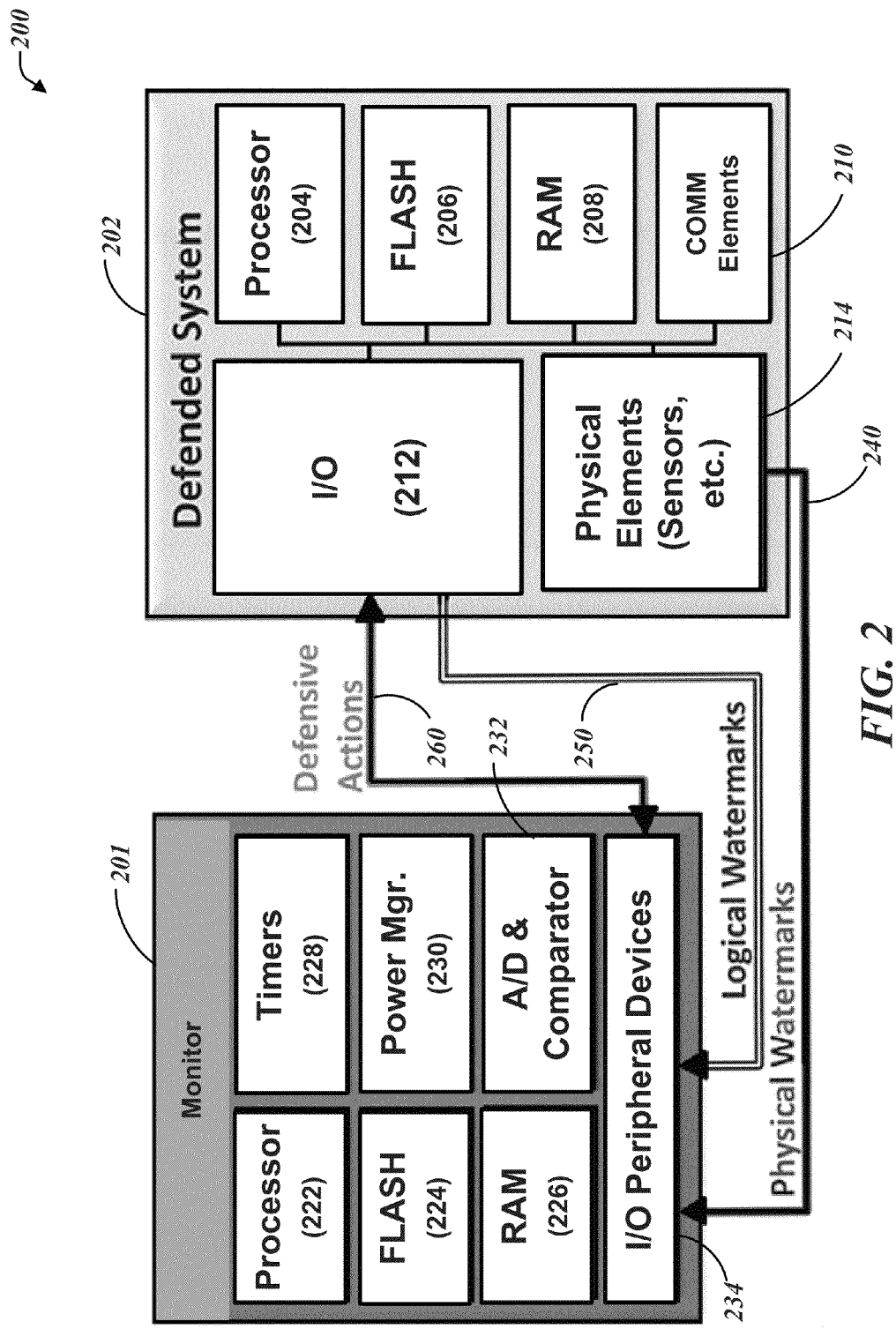
FIG. 2 illustrates an example block diagram of a monitor and a defended system, in accordance with some embodiments.

FIG. 2 illustrates a block diagram 200 of a monitor 201 and a defended system 202. The monitor 201 is independent of the defended system 202, which is being protected by the monitor 201. In an example, the monitor 201 and the defended system 202 may be co-located in a single apparatus, such as a portable radio transceiver or a cellular telephone, or any other device that includes a processor and a power supply. In an example, the monitor 201 and the defended system 202 may be separate modules that are co-located on a single circuit board or in a collection of circuits that are part of a single apparatus. In an example, the monitor 201 and the defended system 202 may be implemented in separate devices that are coupled by a physical connector. In an example, the monitor 201 and the defended system 202 may be remotely located from each other, and communicatively coupled by a network or other communication mechanism.

The monitor 201 may provide hardware-assisted, out-of-band data and execution protection that operates independently from the defended system 202. In an example, the monitor 201 may be configured to implement scheme 100. The defended system 202, in an example, may include a processor 204, a programmable FLASH memory 206, or other logic that may include machine-readable instructions, a random access memory (RAM) 208; one or more communication elements 210; an I/O module 212 that may provide communication with peripheral devices; and other physical elements 214, such as one or more sensors or other devices.

The monitor 201, in an example, may include a processor 222, a programmable FLASH memory 224 or other logic that may include machine-readable instructions, a RAM 226, one or more timers 228, a power manager 230, an analog-to-digital converter and comparator 232, and one or more I/O modules 234 configured to communicate with one or more peripheral devices, which may include the defended system 202.

The defended system 202 may be coupled to the monitor 201 by one or more communication or I/O links. For example, the monitor 201 may receive physical watermark data from physical elements 214 of the defended system 202 via a data link 240. The monitor 201 may receive logical watermark data from the defended system 202 via an I/O link 250. The data link 240 and the I/O link 250 may be combined into a single communication link, or include multiple separate links or communication paths depending on the type of data or number of elements that the defended system 202 is capable of providing to the monitor 201. In an example, the data link 240 and the I/O link 250 may be one-way communication links that provide data only from the defended system 202 to the monitor 201.

In an example, a connection 260 may be provided between the monitor 201 and the defended system 202. The connection 260 may communicatively couple the I/O module 234 of monitor 201 with the I/O module 212 of the defended system 202. The connection 260 may include the I/O link 250. The connection 260 may provide a mechanism for the monitor 201 to instruct the defended system 202 to take a defensive action. The connection 260 may provide a mechanism to scrub the defended system 202, which may include erasing the flash memory 206 or the RAM 208 of the defended system 202.

The data link 240, the I/O link 250, and connection 260 may be implemented with any of a variety of interfaces, such as those common in embedded, real-time systems such as: Serial Peripheral Interface Bus (SPI), two-wire interface (e.g., I2C), Universal Serial Bus (USB), General Purpose Input/Output (GPIO), JTAG as standardized in the Institute of Electrical and Electronics Engineers (IEEE) 1149.1 Standard Test Access Port and Boundary-Scan Architecture, or any other appropriate interface mechanism.

The monitor 201 may utilize out-of-band temporal and collective analysis of dynamic operational watermarks (logical and physical operational characteristics of the defended system 202) to provide hardware-assisted data and execution assurance, which is independent of potential attack surfaces of the defended system 202. The defended system 202 may include, for example, embedded, real-time systems with deterministic operational parameters, such as trusted video cards, secure video devices, tactical radios, sensors, telemetry units, and similar assets.

The well-bounded characteristics of real-time systems make small deviations in the dynamic operational watermarks reliable indicators for detection of anomalous operation. The monitor 201 may be constructed to require minimal, if any, maintenance and include ultra-low power hardware that may operate for years on minimal battery power. The monitor 201 may thus be well suited for use in assets, such as defended system 201, that are deployed in remote or inaccessible locations.

In an example, the processor 222 of monitor 201 may include an out-of-band processor or logic device, such as microcontroller MSP430F5529IPN, which is commercially available from Texas Instruments of Dallas, Tex. The processor 222 may be configured to continuously evaluate dynamic operational watermarks of the defended system 202 to establish provenance, pedigree, and assurance, as well as to perform tamper detection and mitigation. The out-of-band nature of processor 222 may provide independent assurance and protection of the defended system 202, thus eliminating the circular dependency of a compromised system needing to take its own defensive actions.

The monitor 201 may include fault-tolerance techniques that may be utilized to fine tune the behavior of monitor 201 to compensate for component drift or changes in operational state of the monitor 201 or the defended system 202. The monitor 201 may provide integrity assurance and tamper detection for the defended system 202 through analysis of the dynamic operational watermark data (e.g., physical or logical data) with respect to value, periodicity, rate of change, and oscillation. For example, the highly deterministic nature of certain embedded systems may indicate to the monitor 201 that small deviations in one or more watermarks may have significant meaning (for example, indicating an attempt has been made to tamper or corrupt the defended system). In another example, in a defended system 202 that is less deterministic (for example, a general purpose personal computer), small deviations in multiple watermarks may indicate normal operation.

The monitor 201 may use a flexible, heterogeneous set of dynamic operational watermarks that include both logical and physical operational parameters, analogous to a set of distributed heterogeneous sensors, each of which may be an input to monitor 201. Examples of dynamic operational watermarks may include: logical—execution timing, execution sequencing, data transactions, I/O activity or function periodicity; performance—processes, threads, memory accesses, memory allocation, peripheral connections, or I/O traffic; or physical—power consumption, power variations, or temperature fluctuations.

The monitor 201 may invoke a customizable set of defensive actions for mitigating a tamper attack. For example, the monitor 201 may covertly report the tampering via a back-channel (e.g., wireless communications), scrub any critical technology or information from the defended system 202, initiate self-scrubbing of the monitor 201, or cloaking of the monitor 201, and transition the defended system 202 into a fail-safe state or 'honey-pot' state.

Figure 3:
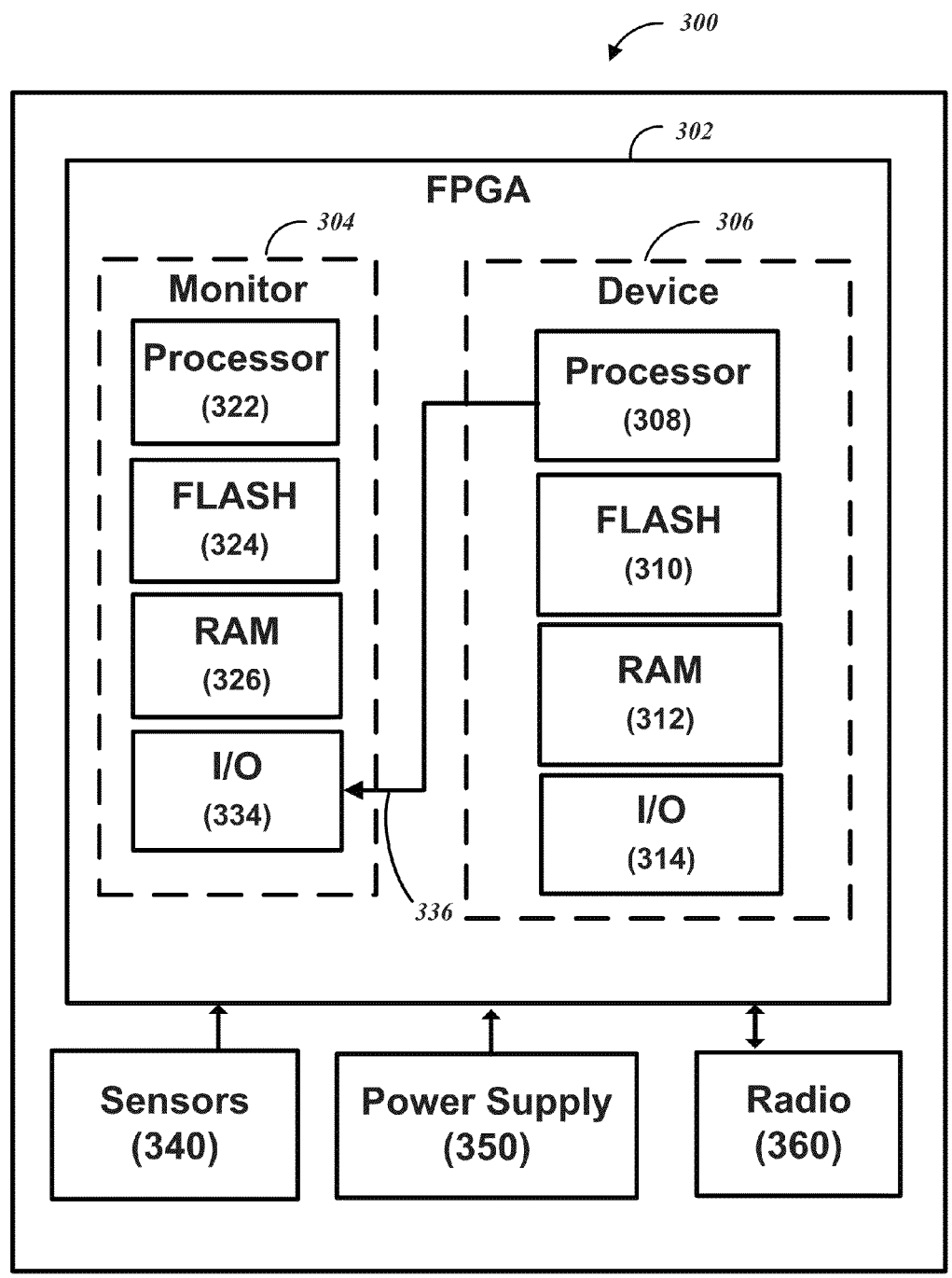
FIG. 3 illustrates an example block diagram of a single device with a monitor and a defended device, in accordance with some embodiments.

FIG. 3 illustrates an example block diagram of an apparatus 300, that may include, for example, a field programmable gate array (FPGA) 302 that comprises both a monitor 304 and a defended device 306. In an example, the monitor 304 and the defended device 306 are located in separate memory partitions of the FPGA 302 such that both the monitor 304 and the defended device 306 are part of a single device. A real-time operating system (RTOS) may operate independently in each of the memory portions occupied by the monitor 304 and the defended device 306. The monitor 304 and the defended device 306 may each utilize a different RTOS than the other.

The defended device 306 may include a processor 308, programmable FLASH memory 310, RAM 312, and an I/O interface 314. The monitor 304 may include a processor 322, programmable FLASH memory 324, RAM 326, and an I/O interface 334. The I/O interface 334 may be coupled to the processor 308 of the defended device 306 via link 336. The link 336 may provide logical watermark data to the monitor 304 from the defended device 306.

In an example, the apparatus 300 may include one or more sensors 340 and a power supply 350. The one or more sensors 340 may include devices such as an electronic compass (e.g., a magnetometer), an accelerometer, a gyroscopic sensor, a temperature sensor, a humidity sensor (e.g., an electronic hygrometer), a barometric pressure sensor, a chemical vapor sensor, a radiation sensor, a microphone, an electric current sensor, or any other environmental or operational sensor. For example, the electric current sensor may be disposed between the power supply 350 and the FPGA 302, and configured to provide electric current data to the monitor 304. In this configuration, the monitor 304 may determine a pattern of usage of current by the defended device 306, and observe any change in current usage (e.g., a current spike) that may indicate tampering with the defended device 306. Any other of the one or more sensors 340 may also be configured to provide data to the monitor 304 in a similar manner. The one or more sensors 340 may be coupled to the defended device 306, the monitor 304, or both.

In an example, the apparatus 300 may include a radio 360 such as a cellular modem, a satellite modem, a Wi-Fi transceiver (e.g., any transceiver compatible with one of the IEEE 802.11 family of standards), or any other communication device. The radio 360 may be utilized by the defended device 306, the monitor 304, or both. The monitor 304 may utilize the radio 360 to transmit notifications and data to a remote monitoring receiver (not depicted) when the monitor 304 determines that apparatus 300 has been tampered with.

Figure 4:
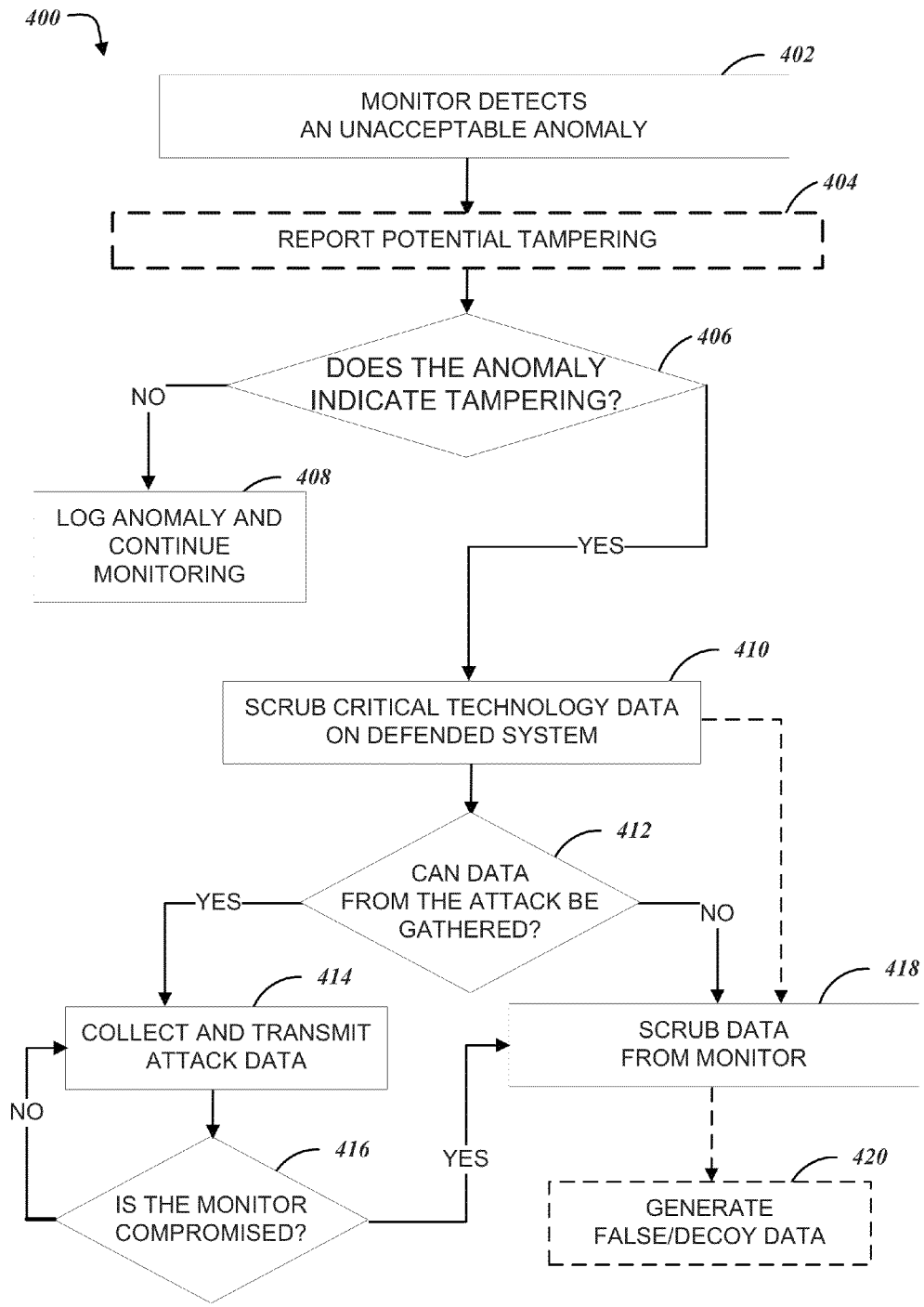
FIG. 4 illustrates a scheme for taking defensive actions, in accordance with some embodiments.

FIG. 4 illustrates a scheme 400 for taking defensive actions, such as at 116 as depicted in FIG. 1. At 402, a monitor may detect an unacceptable anomaly associated with a defended system. Optionally, at 404, if the monitor is equipped with a communication mechanism, such as a cellular modem, a Wi-Fi radio, or any other wired or wireless communication device, the monitor may report to a central authority (e.g., a monitoring server) that a potential tampering event has occurred at the defended system.

At 406, the monitor may attempt to determine if the anomaly is an indication of actual tampering with the device, or if further data is needed. At 408, the monitor may log the anomaly and continue monitoring the defended system if additional data is needed. If the anomaly is indicative of actual tampering, then, at 410, the monitor may scrub proprietary or critical technology data on the defended system. In an example, the monitor may optionally, at 418, scrub any data from its memory, thereby limiting the ability of an attacker to ascertain data from either the defended system or the monitor.

At 412, the monitor may determine that data related to an attack on the defended system can be gathered. At 414, the monitor may collect and transmit data to the central authority, or another monitor, such that the data collected may be utilized to characterize the attack or take further action. The monitor may, at 416, continuously attempt to determine if the monitor itself is compromised by the tampering or an attack. For example, if the defended system is moved without authorization, a motion sensor may indicate to the monitor that the tampering is not necessarily indicative of an attack where the monitor is compromised. In another example, if the monitor has determined that an unauthorized attempt has been made to access the memory or a communication port of the defended system, then the monitor may determine that the attack has the potential to compromise the monitor. At 418, the monitor may scrub any data from its memory, thereby limiting the ability of an attacker to ascertain data from either the defended system or the monitor.

In an example, at 420, the monitor may be optionally configured to generate false decoy data that may be written into a memory of the monitor or the defended system. The monitor may generate the decoy data based on a random number generating algorithm, or a pre-programmed sequence or seed. Any unauthorized tampering (e.g., reverse engineering attempt) conducted on a defended system would accordingly only result in uncovering the decoy data.

Figure 5:
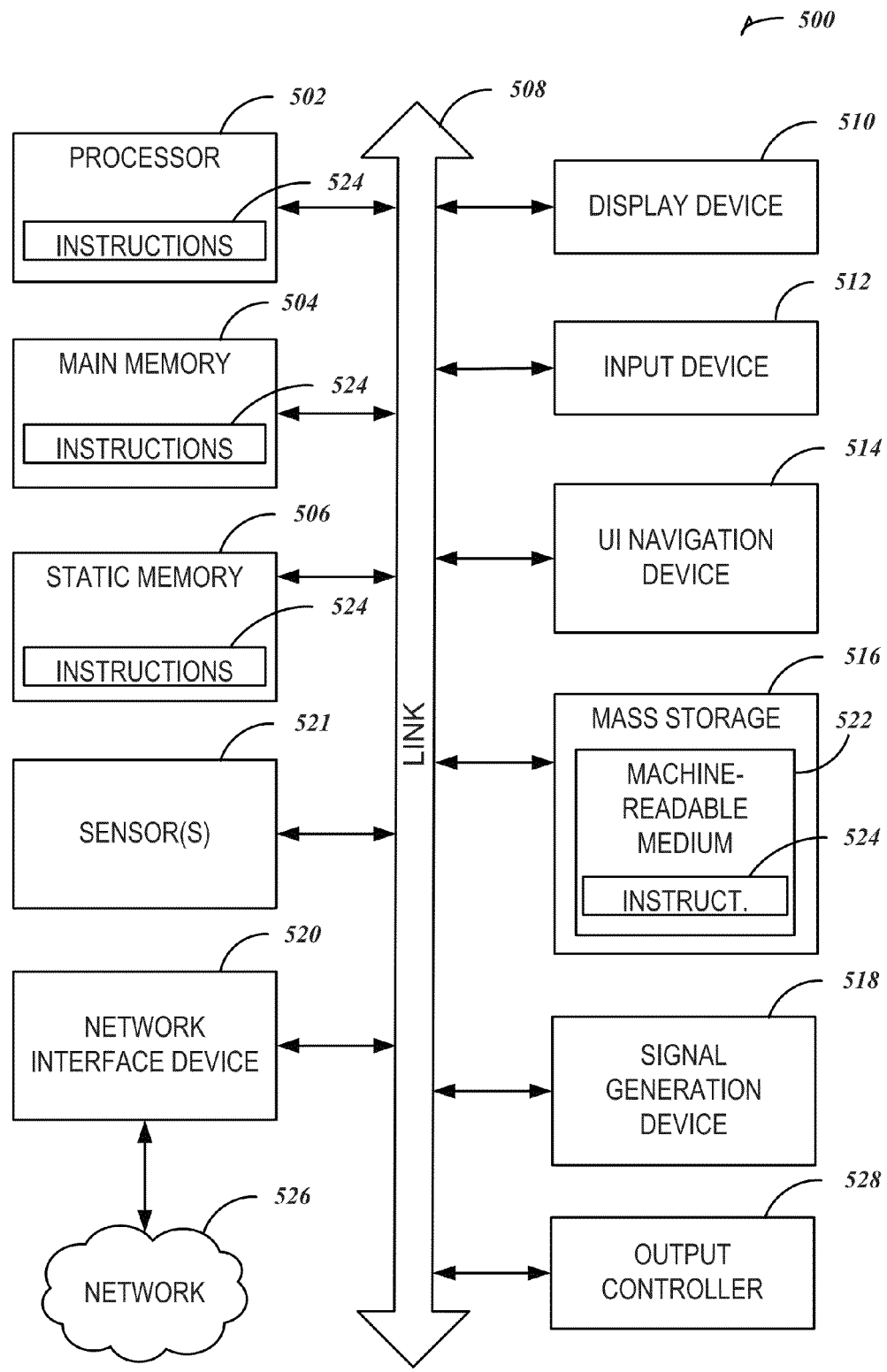
FIG. 5 illustrates a block diagram of an example machine upon which any one or more of the techniques discussed herein may be performed.

FIG. 5 illustrates a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in a peer-to-peer (P2P) (or other distributed) network environment. The machine 500 may be a personal computer (PC), a tablet PC, a personal digital assistant (PDA), a mobile telephone, a web appliance, or any machine capable of executing instructions (sequential or otherwise) that specify actions to be taken by that machine. The machine 500 may operate as a defended system (e.g., system 202 of FIG. 2), as a monitor (e.g., monitor 201 of FIG. 2), or as a single unit with both a monitor and an active device (e.g., apparatus 300 of FIG. 3). Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a processing unit, a graphics processing unit (GPU), a hardware processor core, or any combination thereof), a main memory 504, and a static memory 506, some or all of which may communicate with each other via a link 508 (e.g., a bus, link, interconnect, or the like). The machine 500 may further include a display device 510, an input device 512 (e.g., a keyboard), and a user interface (UI) navigation device 514 (e.g., a mouse). In an example, the display device 510, input device 512, and UI navigation device 514 may be a touch screen display. The machine 500 may additionally include a mass storage (e.g., drive unit) 516, a signal generation device 518 (e.g., a speaker), a network interface device 520, and one or more sensors 521, such as a global positioning system (GPS) sensor, camera, video recorder, compass, accelerometer, or other sensor. The machine 500 may include an output controller 528, such as a serial (e.g., USB, parallel, or other wired or wireless (e.g., infrared (IR)) connection to communicate or control one or more peripheral devices (e.g., a printer, card reader, etc.).

The mass storage 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage 516 may constitute machine readable media.

While the machine-readable medium 522 is illustrated as a single medium, the term "machine readable medium" may include a single medium or multiple media (e.g., a centralized or distributed database, and/or associated caches and servers) that configured to store the one or more instructions 524.

The term "machine-readable medium" may include any tangible medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 500, and includes digital or analog communications signals or other intangible medium to facilitate communication of such software.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A dynamic watermarking method comprising:
   receiving, at a monitor device, a physical watermark and a logical watermark of a defended apparatus, wherein the logical watermark includes at least one of execution timing of the defended apparatus, execution sequencing of the defended apparatus, data transaction of the defended apparatus, input activity of the defended apparatus, output activity of the defended apparatus, and function periodicity of the defended apparatus, and wherein the physical watermark includes a temperature of the defended apparatus or a power-consumption rate of the defended apparatus;
   setting a baseline for the defended apparatus at the monitor device, the baseline including the physical watermark and the logical watermark;
   continuously monitoring, by a processor of the monitor device, the defended apparatus in real-time for a change in the physical watermark or the logical watermark;
   in response to detecting a change in the physical watermark or the logical watermark, comparing the change to a threshold;
   in response to determining the change is less than the threshold updating the baseline to include the change; and
   in response to determining the change is greater than the threshold performing a defensive action,
   wherein performing the defensive action includes generating false decoy data and recording the false decoy data into a memory of the defended apparatus such that tampering with the defended apparatus only uncovers the false decoy data.

2. The method of claim 1, wherein the monitor device and the defended apparatus are co-located.

3. The method of claim 2, further comprising:
   receiving, by the processor of the monitor device, the physical watermark and the logical watermark, wherein the setting of the baseline is performed in response to an initial reception of the physical watermark and the logical watermark.

4. The method of claim 3, wherein the change includes a deviation from the baseline of the physical watermark or the logical watermark, the deviation indicating an attack on the defended apparatus.

5. The method of claim 2, wherein monitoring the defended apparatus for the change in the physical watermark or the logical watermark includes continuously receiving environmental data and execution data from the defended apparatus.

6. The method of claim 5, wherein performing the defensive action includes scrubbing the defended apparatus and the monitor device, and transmitting a notification of the change.

7. The method of claim 6, wherein scrubbing the defended apparatus includes erasing an erasable memory coupled to a processor of the defended apparatus and wherein scrubbing the monitor device includes erasing a portion of the memory of the monitor device.

8. At least one non-transitory machine-readable storage medium comprising a plurality of instructions that in response to being executed on a computing device, cause the computing device to:
   receive a physical watermark and a logical watermark of a defended apparatus, wherein the logical watermark includes at least one of: execution timing of the defended apparatus, execution sequencing of the defended apparatus, data transaction of the defended apparatus, input activity of the defended apparatus, output activity of the defended apparatus, or function periodicity of the defended apparatus; and wherein the physical watermark includes a temperature of the defended apparatus or a power-consumption rate of the defended apparatus;
   set a baseline for the defended apparatus, the baseline including the physical watermark and the logical watermark;
   continuously monitor the defended apparatus in real-time for a change in the physical watermark or the logical watermark;
   in response to detecting a change in the physical watermark or the logical watermark, compare an amount of the change to a threshold;
   in response to determining the change is less than the threshold, update the baseline to include the change;
   and in response to determining the change is greater than the threshold, perform a defensive action in response to the change,
   wherein performing the defensive action includes generating false decoy data and recording the false decoy data into a memory of the defended apparatus such that tampering with the defended apparatus only uncovers the false decoy data.

9. The machine-readable storage medium of claim 8, wherein the monitor device and the defended apparatus are co-located in a single device.

10. The machine-readable storage medium of claim 9, wherein the plurality of instructions further cause the computing device to:
    receive the physical watermark and the logical watermark, wherein the setting of the baseline is performed in response to an initial reception of the physical watermark and the logical watermark.

11. The machine-readable storage medium of claim 8, wherein monitoring the defended apparatus for the change in the physical watermark or the logical watermark includes continuously receiving environmental data and execution data from the defended apparatus.

12. The machine-readable storage medium of claim 9, wherein performing the defensive action includes scrubbing the defended apparatus and the monitor device.

13. The machine-readable storage medium of claim 12, wherein scrubbing the defended apparatus and the monitor device includes erasing the machine-readable medium and wherein scrubbing the monitor device includes erasing a portion of the memory of the monitor device.

14. A system comprising:
a defended apparatus including a processor, one or more sensors, and a first erasable memory coupled to the processor; and
a shadow monitor including a processor coupled to the defended apparatus, a second erasable memory coupled to the processor of the shadow monitor, the shadow monitor being configured to receive a physical watermark and a logical watermark from the defended apparatus, wherein the logical watermark includes at least one of: execution timing of the defended apparatus, execution sequencing of the defended apparatus, data transaction of the defended apparatus, input activity of the defended apparatus, output activity of the defended apparatus, or function periodicity of the defended apparatus; and wherein the physical watermark includes a temperature of the defended apparatus or a power-consumption rate of the defended apparatus,
the shadow monitor configured to establish a baseline for the physical watermark and the logical watermark, store the baseline in the second erasable memory, and continuously monitor the defended apparatus in real-time for data indicating a change in the physical watermark or the logical watermark including comparing the data indicating the change to a threshold,
in response to determining the change is less than the threshold updating the baseline to include the change,
and in response to determining the change is greater than the threshold perform a defensive action in response to the change;
wherein performing the defensive action includes generating false decoy data and recording the false decoy data into a memory of the defended apparatus such that tampering with the defended apparatus only uncovers the false decoy data;
wherein the physical watermark includes data from the one or more sensors of the defended apparatus, and the change includes a deviation from the baseline, the deviation indicating an attack on the defended apparatus.

15. The system of claim 14, wherein the shadow monitor and the defended apparatus are coupled by a network.

16. The system of claim 14, including: a wireless transceiver coupled to the shadow monitor and the defended apparatus; wherein the shadow monitor and the defended apparatus are co-located.

17. The system of claim 16, wherein the defended apparatus includes a real-time operating system executing on the processor of the defended apparatus.

18. The system of claim 17, wherein the processor of the shadow monitor and the processor of the defended apparatus are implemented in a single device.

19. The system of claim 17, wherein the defensive action includes:
transmitting a notification of the change via the wireless transceiver; and
overwriting the first erasable memory and the second erasable memory.

* * * * *